US011816083B2

(12) United States Patent
Ryan et al.

(10) Patent No.: US 11,816,083 B2
(45) Date of Patent: Nov. 14, 2023

(54) METHOD AND SYSTEM FOR INDEXING OF TIME-SERIES DATA

(71) Applicant: Future Grid Pty Ltd, South Melbourne (AU)

(72) Inventors: David Ryan, South Melbourne (AU); Quenton Pongracz, South Melbourne (AU)

(73) Assignee: FUTURE GRID PTY LTD, South Melbourne (AU)

( * ) Notice: Subject to any disclaimer, the term of this patent is extended or adjusted under 35 U.S.C. 154(b) by 107 days.

(21) Appl. No.: 17/250,801

(22) PCT Filed: Sep. 3, 2019

(86) PCT No.: PCT/AU2019/050930
§ 371 (c)(1),
(2) Date: Mar. 4, 2021

(87) PCT Pub. No.: WO2020/047584
PCT Pub. Date: Mar. 12, 2020

(65) Prior Publication Data
US 2021/0319002 A1 Oct. 14, 2021

(30) Foreign Application Priority Data

Sep. 4, 2018 (AU) .............................. 2018903274

(51) Int. Cl.
*G06F 16/20* (2019.01)
*G06F 16/22* (2019.01)
(Continued)

(52) U.S. Cl.
CPC ...... *G06F 16/2246* (2019.01); *G06F 16/2322* (2019.01); *G06F 16/24552* (2019.01); *G06F 16/24573* (2019.01)

(58) Field of Classification Search
CPC ............. G06F 16/2246; G06F 16/2322; G06F 16/24573; G06F 16/24552; G06F 16/244552
See application file for complete search history.

(56) References Cited

U.S. PATENT DOCUMENTS

| 6,711,562 B1 * | 3/2004 | Ross ................... G06F 16/2246 707/999.2 |
| 6,944,598 B1 * | 9/2005 | Cline ..................... G06Q 10/04 705/28 |

(Continued)

FOREIGN PATENT DOCUMENTS

| EP | 1160682 A1 * | 12/2001 | ....... G06F 17/30961 |
| EP | 1160682 A1 | 12/2001 | |

OTHER PUBLICATIONS

Kriegel et al., "Interval Sequences: Manage Spatial Data Efficiently in Your Relational Database", Institute for Computer Science, University of Munich, Aug. 2000, 12 pages.

(Continued)

*Primary Examiner* — Mahesh H Dwivedi
(74) *Attorney, Agent, or Firm* — Westman, Champlin & Koehler, P.A.

(57) ABSTRACT

A method of maintaining an index of time-series data records held in a data store comprises identifying one or more time-series data records not currently indexed in a binary tree structure and corresponding with a time range, and creating a new leaf node. Start-time and end-time fields of the new leaf node are populated with values encompassing the time range corresponding with identified time-series data records. The binary tree structure is updated such that the new leaf node is added as a first or second child node of a parent node representing a time range encompassing the values of the start-time and end-time fields of the new leaf node. Existence of the new leaf node in the binary tree (Continued)

structure is thereby indicative of existence of the one or more identified time-series data records in the data store.

15 Claims, 7 Drawing Sheets

(51) Int. Cl.
*G06F 16/2457* (2019.01)
*G06F 16/2455* (2019.01)
*G06F 16/23* (2019.01)

(56) References Cited

U.S. PATENT DOCUMENTS

| | | | | |
|---|---|---|---|---|
| 2006/0004715 A1* | 1/2006 | Lock | ............... | G06F 16/284 |
| 2007/0162513 A1* | 7/2007 | Lewin | ............... | G06F 16/2358 |
| 2007/0233720 A1* | 10/2007 | Bae | ............... | G06F 16/2246 |
| 2010/0306249 A1* | 12/2010 | Hill | ............... | G06F 16/9535 |
| | | | | 707/769 |
| 2015/0370836 A1* | 12/2015 | Finis | ............... | G06F 16/00 |
| | | | | 707/695 |
| 2016/0012110 A1* | 1/2016 | Hirzel | ............... | G06F 16/2246 |
| | | | | 707/797 |
| 2016/0036911 A1* | 2/2016 | Kumar | ............... | H04L 51/42 |
| | | | | 709/203 |
| 2019/0005101 A1* | 1/2019 | Jian | ............... | G06F 16/242 |
| 2020/0278885 A1* | 9/2020 | Hand | ............... | G06F 11/3065 |

OTHER PUBLICATIONS

International Search Report and Written Opinion in corresponding International Patent Application No. PCT/AU2019/050930 dated Dec. 9, 2019.

* cited by examiner

METHOD AND SYSTEM FOR INDEXING OF TIME-SERIES DATA

CROSS-REFERENCE TO RELATED APPLICATION(S)

This application is a Section 371 National Stage Application of International No. PCT/AU2019/050930, filed Sep. 3, 2019 and published as WO 2020/047584 A1 on Mar. 12, 2020, in English, and further claims priority to Australian Patent Application Ser. No. 2018903274, filed Sep. 4, 2018, the contents of which are hereby incorporated by reference in their entirety.

FIELD OF THE INVENTION

The invention relates to the technical field of information processing, and in particular to a method and system for indexing of time-series data. Embodiments of the invention may be employed to improve processing speed and resource utilisation in applications involving processing of large volumes of time-series data.

BACKGROUND OF THE INVENTION

With the development of computer, data communication and real-time monitoring technologies, time-series databases have increasingly been employed in applications such as device monitoring, production line management and financial analysis. Time-series data may comprise any information that is characterised by, or contains, a time element, while a time series database may be any database used for storing time-series data. The following are examples of time-series data: in an application environment of monitoring bridge security, data being collected may comprise pressure data and/or intensity of pressure data collected by certain sensors; in an application environment of weather forecast, data being collected may comprise temperature, humidity, pressure, wind force, and so forth; in an application environment of monitoring utility usage data captured by smart meters installed at homes and/or businesses, data being collected may comprise electricity usage (e.g. in kilowatt-hours), gas volume, and/or water volume over specified time intervals. Collection and storage of large volumes of time-series data is increasing even more rapidly with the rise of the so-called 'Internet of Things' (IoT).

Along with the increasing collection and storage of time-series data, there is a corresponding need for systems which can efficiently analyse the time-series data. However, such systems may encounter technical challenges, particularly in situations where the data rate of the time-series data is very high or where the quantity of the time-series data is very large. Accordingly, there is a need for improved systems that are capable of efficiently accessing and analysing time-series data.

A common approach for improving the efficiency of processing data held in a data store, such as a remote database, is to employ a cache that contains copies of recently requested data. A cache ensures that if a request is made for the same data multiple times, all subsequent requests read data from the cache, rather than sending a request to the data store. This reduces the need for an application to request the same data from the data store each time, which carries a cost in terms of the time/latency, and corresponding loss of CPU utilisation, associated with the processing engine waiting for data to be retrieved before processing can be completed.

However, a simple application cache may be unaware of whether data exists in the data store prior to attempting retrieval. Accordingly, when the application makes a request for data, and the data is not found in the cache, a request is made to the data store. For high-performance systems, the cost, e.g. in CPU workload and latency, associated with making large numbers of requests may be high, and thus avoiding unnecessary requests improves performance. To resolve this, another common approach is to employ an index. An index allows the cache to be aware if data exists in the data store prior to performing a request. When combined with a cache, the index enables requests for non-existent data to be avoided.

The large volumes, and temporal nature, of time-series data sets it apart in many ways from other types of data for which databases and other forms of data store have conventionally been employed. For example, there may be a particular emphasis, in applications involving processing of time-series data, on requests to retrieve data corresponding with specific time periods or intervals. Existing indexing approaches are typically not optimised for such requests. There is, as a result, a need for new indexing approaches that are specifically tailored to time-series data and which are thereby able to improve performance of time-series data processing applications and systems. Embodiments of the present invention are directed to addressing this need.

SUMMARY OF THE INVENTION

In one aspect, the invention provides a method of maintaining an index of time-series data records held in a data store, the index having a binary tree structure of nodes including a root node representing a maximal time period and zero or more non-root nodes, wherein each non-root node is a leaf node or an inode which comprises a data structure including a start-time field and an end-time field defining a time range represented by the non-root node and, in the case of an inode, reference fields identifying one or both of a first child node representing a first time sub-range and a second child node representing a second time sub-range, and wherein existence of a leaf node in the binary tree structure is indicative of existence of at least one time-series data record in the data store corresponding with the time range represented by the leaf node, the method comprising:

identifying one or more time-series data records in the data store not currently indexed in the binary tree structure and corresponding with a time range;

creating a new leaf node;

populating the start-time and end-time fields of the new leaf node with values encompassing the time range corresponding with the identified time-series data records; and updating the binary tree structure such that the new leaf node is added as a first or second child node of a parent node representing a time range encompassing the values of the start-time and end-time fields of the new leaf node, whereby existence of the new leaf node in the binary tree structure is indicative of existence of the one or more identified time-series data records in the data store.

Advantageously, an index maintained in accordance with an embodiment of the invention enables an application executing on a computer system to determine rapidly whether or not there are any time-series data records corresponding with a given time range stored in a data store, such as at a remote database server. This enables the application, which may comprise a cache module for maintaining a local cache of remote time-series data, to avoid making requests that will not result in any additional data being returned. Due to the cost of making such requests, in terms of CPU time and latency in receiving responses to database queries, this can result in significant performance improvements in the application and associated computer system.

In this specification (including the claims) the term 'inode' is used consistently as a shortened form of the terms 'intermediate node', 'internal node', and 'inner node', all of which are commonly-used to refer to nodes within a tree data structure that are internal to the tree, i.e. that have one or more child nodes (and are therefore not leaf nodes), and that have a parent node (and are therefore not the root node).

In the case of a simple branching operation, updating the binary tree structure may comprise adding the new leaf node as a first or second child node of an existing node of the binary tree structure. However, embodiments of the invention advantageously provide operations for performing a range updates to handle different circumstances and requirements, while maintaining high performance of the index.

For example, updating the binary tree structure may comprise adding a common base node where simple branching of an existing node is not possible or desirable, and in particular may include steps of:

creating at least one new inode;

populating the start-time and end-time fields of the new inode with values encompassing the time range corresponding with the identified time-series data records and a time range corresponding with an existing leaf node, wherein the existing leaf node has an existing parent node representing a broader encompassing time range;

populating the reference fields of the new inode with references identifying each one of the existing leaf node and the new leaf node as one of the first and second child nodes of the new inode; and updating the binary tree structure such that a reference to the new inode replaces a reference to the existing leaf node in the existing parent node.

In embodiments of the invention, each node of the binary tree structure is constrained to index up to a maximum number of time-series data records. In such embodiments, where indexing the one or more identified time-series data records by an existing leaf node would exceed the maximum number, updating the binary tree structure may then comprise:

pooling the identified time-series data records with time series data records indexed by the existing leaf node;

creating at least two new nodes, such that the existing leaf node and the new nodes comprise at least a base inode and first and second leaf nodes;

populating the start-time and end-time fields of the first leaf node with values encompassing a first time sub-range corresponding with up to the maximum number of time-series data records from the pooled time-series data records, and the start-time and end-time fields of the second leaf node with values encompassing a second time sub-range corresponding with up to the maximum number of time-series data records from the pooled time-series data records, wherein the first time sub-range is distinct from the second time sub-range; and updating the binary tree structure such that the first and second leaf nodes are added as first and second child nodes of the base inode, which is linked to a parent node representing a time range encompassing the values of the start-time and end-time fields of the first and second leaf nodes.

In some embodiments, at least one node of the binary tree structure comprises an index field including a plurality of time-series data existence indicator elements, wherein each time-series data existence indicator element represents a corresponding fixed time range encompassed by the time range represented by the node and is indicative of the existence in the data store of time-series data within the fixed time range. Advantageously, such an arrangement enables tracking of whether or not time-series data exists in the data store corresponding with each fixed time range without maintaining a full tree structure, and may be more space-efficient in applications involving large amounts of data that is relatively uniform over time, i.e. where the time-series data is not sparse or disjoint.

Each time-series data existence indicator element may comprise at least a positive state, indicative of existence in the data store of time-series data within the corresponding fixed time range, and a negative state, indicative of non-existence in the data store of time-series data within the corresponding fixed time range. Advantageously, such an indicator may be stored using a single bit. Additionally, each time-series data existence indicator may comprise one or more of an 'unknown' state, indicative that it is not known whether time-series data exists in the data store within the corresponding fixed time range, and an 'additional index' state, indicative that one or more additional nodes exist for indexing time-series data records within the corresponding fixed time range. Such an extended indicator may be stored using two bits. Advantageously, each fixed time range may correspond with a partition of time-series data records held in the data store, such that when queries are made to the data store they may be aligned and optimized.

In another aspect, the invention provides a method of managing a cache of time-series data records held in a data store, comprising:

providing a time-series data index having a binary tree structure of nodes including a root node representing a maximal time period and zero or more non-root nodes, wherein each non-root node is a leaf node or an inode which comprises a data structure including a start-time field and an end-time field defining a time range represented by the non-root node and, in the case of an inode, reference fields identifying one or both of a first child node representing a first time sub-range and a second child node representing a second time sub-range, and wherein existence of a leaf node in the binary tree structure is indicative of existence of at least one time-series data record in the data store corresponding with the time range represented by the leaf node;

receiving a request for one or more time-series data records not contained in the cache, and corresponding with a requested time interval;

searching the time-series data index for a leaf node representing a time range corresponding with the requested time interval; and returning an indication of the existence of data records corresponding with the requested time interval in the data store, based upon the result of searching the time-series data index.

In the event that data records corresponding with the requested time interval exist in the data store, the method in this aspect may further comprise:

retrieving the data records corresponding with the requested time interval exist from the data store; and storing the retrieved data records in the cache.

In yet another aspect, the invention provides a system for maintaining an index of time-series data records held in a data store, the system comprising:

a processor; and at least one memory device accessible via the processor, which contains a binary tree structure of nodes including a root node representing a maximal time period and zero or more non-root nodes, wherein each non-root node is a leaf node or an inode which comprises a data structure including a start-time field and an end-time field defining a time range represented by the non-root node and, in the case of an inode, reference fields identifying one or both of a first child node representing a first time sub-range and a second child node representing a second time sub-range, and wherein existence of a leaf node in the binary tree structure is indicative of existence of at least one time-series data record in the data store corresponding with the time range represented by the leaf node, the memory device further containing a body of program instructions which, when executed by the processor, cause the computing system to implement a method comprising steps of:

identifying one or more time-series data records in the data store not currently indexed in the binary tree structure and corresponding with a time range;

creating a new leaf node;

populating the start-time and end-time fields of the new leaf node with values encompassing the time range corresponding with the identified time-series data records: and updating the binary tree structure such that the new leaf node is added as a first or second child node of a parent node representing a time range encompassing the values of the start-time and end-time fields of the new leaf node, whereby existence of the new leaf node in the binary tree structure is indicative of existence of the one or more identified time-series data records in the data store.

In a further aspect, the invention provides a system for managing a cache of time-series data records held in a data store, the system comprising:

a processor; and at least one memory device accessible via the processor, which contains a time-series data index having a binary tree structure of nodes including a root node representing a maximal time period and zero or more non-root nodes, wherein each non-root node is a leaf node or an inode which comprises a data structure including a start-time field and an end-time field defining a time range represented by the non-root node and, in the case of an inode, reference fields identifying one or both of a first child node representing a first time sub-range and a second child node representing a second time sub-range, and wherein existence of a leaf node in the binary tree structure is indicative of existence of at least one time-series data record in the data store corresponding with the time range represented by the leaf node, the memory device further containing a body of program instructions which, when executed by the processor, cause the system to implement a method comprising steps of:

receiving a request for one or more time-series data records not contained in the cache, and corresponding with a requested time interval;

searching the time-series data index for a leaf node representing a time range corresponding with the requested time interval; and returning an indication of the existence of data records corresponding with the requested time interval in the data store, based upon the result of searching the time-series data index.

In further aspects, the invention provides computer program products comprising one or more computer-readable media having instructions stored thereon which, when executed by a processor, implement a method or system for maintaining an index of time-series data records held in a data store and/or managing a cache of time-series data records held in a data store, according to any one of the preceding aspects of the invention.

Further aspects, advantages, and features of embodiments of the invention will be apparent to persons skilled in the relevant arts from the following description of various embodiments. It will be appreciated, however, that the invention is not limited to the embodiments described, which are provided in order to illustrate the principles of the invention as defined in the foregoing statements and in the appended claims, and to assist skilled persons in putting these principles into practical effect.

BRIEF DESCRIPTION OF THE DRAWINGS

Embodiments of the invention will now be described with reference to the accompanying drawings, in which like reference numerals refer to like features, and wherein.

DESCRIPTION OF PREFERRED EMBODIMENTS

Figure 1:
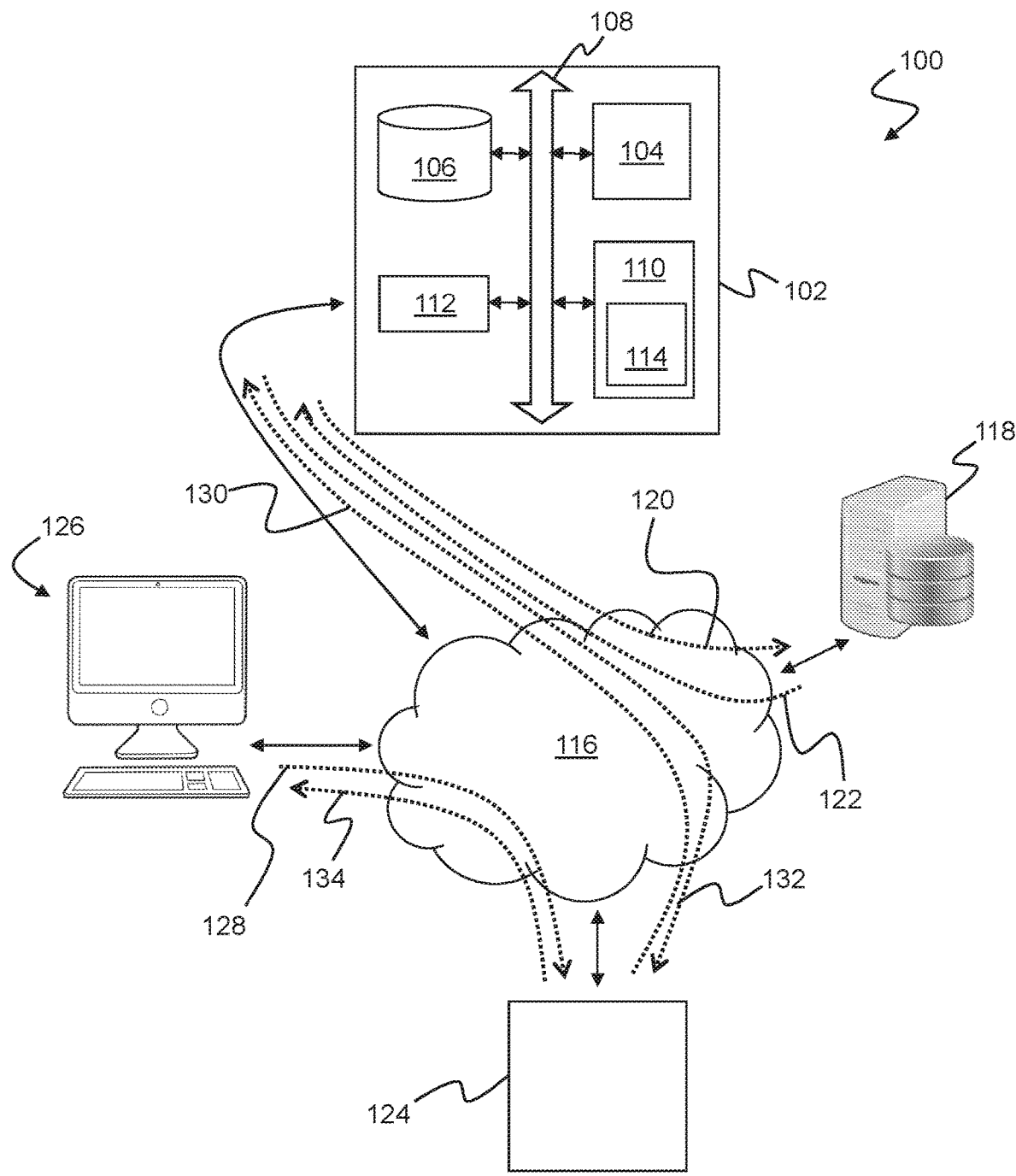
FIG. 1 is a block diagram illustrating an exemplary networked system including a middleware server embodying the invention.

FIG. 1 is a block diagram illustrating an exemplary networked system 100 including a middleware server 102 embodying the invention. In particular, the middleware server 102 comprises an indexing module configured to maintain an index of time-series data records held in a data store in accordance with an embodiment of the invention. For concreteness, an embodiment of the invention is described with reference to the middleware server 102 which provides data processing and presentation services in relation to large volumes of time-series data via an application programming interface (API), wherein the indexing module is employed in conjunction with a cache module in order to manage requests for data made to a remote data store, as will be further described below with reference to FIG. 2. However, it will be appreciated that this is merely one example, to illustrate the system and method, and it will be appreciated that further embodiments of the invention may be employed in other applications requiring indexing of time-series data.

The middleware server 102 may comprise a computer system having a conventional architecture. In particular, the middleware server 102, as illustrated, comprises a processor 104. The processor 104 is operably associated with a non-volatile memory/storage device 106, e.g. via one or more data/address busses 108 as shown. The non-volatile storage 106 may be a hard disk drive, and/or may include a solid-state non-volatile memory, such as ROM, flash memory, solid-state drive (SSD), or the like. The processor 104 is also interfaced to volatile storage 110, such as RAM, which contains program instructions and transient data relating to the operation of the middleware server 102.

In a conventional configuration, the storage device 106 maintains known program and data content relevant to the normal operation of the middleware server 102. For example, the storage device 106 may contain operating system programs and data, as well as other executable application software necessary for the intended functions of the middleware server 102. The storage device 106 also contains program instructions which, when executed by the processor 104, cause the middleware server 102 to perform operations relating to an embodiment of the present invention, such as are described in greater detail below, and with reference to FIGS. 2 to 6 in particular. In operation, instructions and data held on the storage device 106 are transferred to volatile memory 110 for execution on demand.

The processor 104 is also operably associated with a communications interface 112 in a conventional manner. The communications interface 112 facilitates access to a wide-area data communications network, such as the Internet 116.

In use, the volatile storage 110 contains a corresponding body 114 of program instructions transferred from the storage device 106 and configured to perform processing and other operations embodying features of the present invention. The program instructions 114 comprise a technical contribution to the art developed and configured specifically to implement an embodiment of the invention, over and above well-understood, routine, and conventional activity in relation to time-series data indexing systems, as further described below, particularly with reference to FIGS. 3 to 7.

With regard to the preceding overview of the middleware server 102, and other processing systems and devices described in this specification, terms such as 'processor', 'computer', and so forth, unless otherwise required by the context, should be understood as referring to a range of possible implementations of devices, apparatus and systems comprising a combination of hardware and software. This includes single-processor and multi-processor devices and apparatus, including portable devices, desktop computers, and various types of server systems, including cooperating hardware and software platforms that may be co-located or distributed. Physical processors may include general purpose CPUs, digital signal processors, graphics processing units (GPUs), and/or other hardware devices suitable for efficient execution of required programs and algorithms.

Computing systems may include conventional personal computer architectures, or other general-purpose hardware platforms. Software may include open-source and/or commercially-available operating system software in combination with various application and service programs. Alternatively, computing or processing platforms may comprise custom hardware and/or software architectures. For enhanced scalability, computing and processing systems may comprise cloud computing platforms, enabling physical hardware resources to be allocated dynamically in response to service demands. While all of these variations fall within the scope of the present invention, for ease of explanation and understanding the exemplary embodiments are described herein with illustrative reference to single-processor general-purpose computing platforms, commonly available operating system platforms, and/or widely available consumer products, such as desktop PCs, notebook or laptop PCs, smartphones, tablet computers, and so forth.

In particular, the terms 'processing unit' and 'module' are used in this specification to refer to any suitable combination of hardware and software configured to perform a particular defined task, such as accessing and processing offline or online data, and maintaining one or more indices of time-series data. Such a processing unit or module may comprise executable code executing at a single location on a single processing device, or may comprise cooperating executable code modules executing in multiple locations and/or on multiple processing devices. For example, in some embodiments of the invention, processing, indexing, and caching of time-series data may be carried out entirely by code executing on a single system, such as the middleware server 102, while in other embodiments corresponding processing may be performed in a distributed manner over a plurality of systems.

Software components, e.g. program instructions 114, embodying features of the invention may be developed using any suitable programming language, development environment, or combinations of languages and development environments, as will be familiar to persons skilled in the art of software engineering. For example, suitable software may be developed using the C programming language, the Java programming language, the C++ programming language, the Go programming language, the Python programming language, and/or other languages suitable for implementation of time-series data processing, indexing, caching, and/or serving of processed data via an API or other interface. Development of software modules embodying the invention may also be supported by the use of existing code libraries and frameworks. It will be appreciated by skilled persons, however, that embodiments of the invention involve the implementation of software structures and code that are not well-understood, routine, or conventional in relation to time-series data indexing, and that while pre-existing libraries may assist implementation, they require specific configuration and extensive augmentation (i.e. additional code development) in order to realise various benefits and advantages of the invention and implement the specific data structures, processing, computations, and algorithms described below, particularly with reference to FIGS. 3 to 7.

The foregoing examples of languages, environments, and code libraries are not intended to be limiting, and it will be appreciated that any convenient languages, libraries, and development systems may be employed, in accordance with system requirements. The descriptions, block diagrams, flowcharts, equations, and so forth, presented in this specification are provided, by way of example, to enable those skilled in the arts of software engineering and machine learning to understand and appreciate the features, nature, and scope of the invention, and to put one or more embodiments of the invention into effect by implementation of suitable software code using any suitable languages, frameworks, libraries and development systems in accordance with this disclosure without exercise of additional inventive ingenuity.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media may include volatile and non-volatile, and removable and non-removable, tangible media implemented in any method or technology for storage of information, such as computer-readable instructions, data structures, program modules, or other data. Computer readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. While a computer readable storage medium may not comprise transitory signals per se (e.g. radio waves or other propagating electromagnetic waves, electromagnetic waves propagating through a transmission media such as a waveguide, or electrical signals transmitted through a wire), computer readable program instructions may be downloaded via such transitory signals to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts and/or block diagrams shown in the accompanying drawings. The computer program instructions may be provided to one or more processors of a general-purpose computer, a special purpose computer, or other programmable data processing apparatus to produce a machine, such that the instructions, which execute via the one or more processors, cause a series of computations to be performed to implement the functions, acts, and/or operations specified in the flowcharts and/or block diagrams.

Returning to the discussion of FIG. 1, the networked system 100 includes a database server 118, which includes a database (not shown) of time-series data, such as may be captured by various monitoring devices, gathered by online systems, or generated from a variety of sources. While a single database server 118 is shown in FIG. 1, by way of illustration, it will be appreciated that in some embodiments time-series data required for processing by the middleware system 102 may be stored in multiple locations, including local and/or remote files, databases, and other forms of data store. As shown, the middleware server is able to generate requests 120 to store and/or retrieve data, and to receive responses 122 from the database server 118 via the internet 116.

The exemplary system 100 also includes an application server 124, the specific details of which are not material to the present description of embodiments of the invention. For example, an application server 124 may comprise a web server that provides a time-series data analytics and presentation service to one or more end users 126 via the internet 116. In a typical scenario of this type, the end user 126 may make a request 128 for a presentation of data, e.g. a web page, to the application server 124. The application server 124 then transmits a corresponding request 130 for the required data to the middleware server 102 via its API. The middleware server 102 provides a response 132 to the request 130 which comprises the requested data. The received data is then formatted, e.g. in the form of a web page, and transmitted 134 to the end user 126 for presentation, e.g. in a standard web browser window, tab, or frame.

Figure 2:
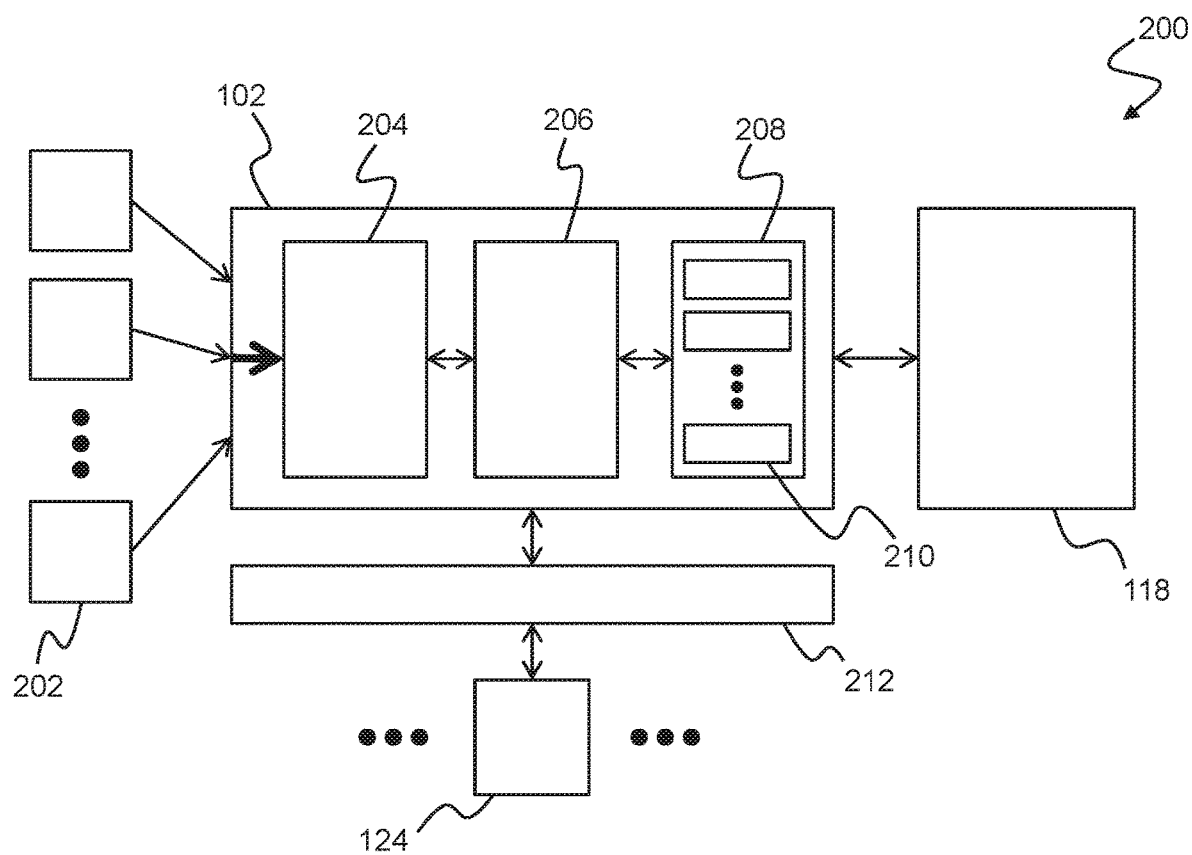
FIG. 2 is a functional block diagram of a system comprising a middleware server embodying the invention.
Figure 3:
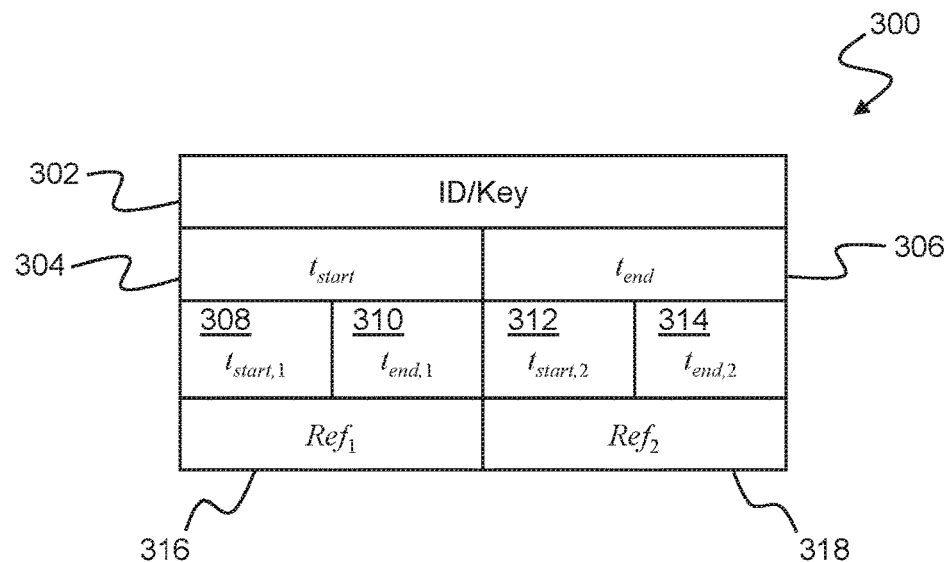
FIG. 3 is a schematic diagram of a data structure representing a node in an index of time-series data embodying the invention.

FIG. 2 shows a functional block diagram 200 of a system comprising a middleware server 102 embodying the invention. The middleware server 102 is configured to receive input time-series data captured by a plurality of remote devices 202. Time-series data may comprise any information that is characterised by, or contains, a time element. Examples of time-series data include records of environmental conditions (e.g. temperature, pressure, humidity, rainfall) captured by weather-monitoring devices, status of infrastructure and machinery captured by sensor devices, and energy usage data captured by smart meters installed at homes and/or businesses. It should be appreciated that the functional diagram 200 does not show the mechanism by which time-series data is input to the middleware server. In various embodiments, time-series data may be transmitted directly from capture devices 202 to the server 102, may be retrieved directly by the server 102, or may be transmitted to the database server 118, to another database (not shown), or to other temporary storage (not shown) for subsequent retrieval and processing by the server 102. These examples are provided by way of illustration, and are not intended to be limiting of the mechanisms by which time-series data may be provided for processing by the middleware server 102.

The middleware server includes a data processing module 204, which is configured to perform processing of time-series data. Processing may include checking and cleaning of incoming data, summarising time-series data, and/or computing additional quantities based upon individual or multiple sources of time-series data. For example, processing may include computing summary statistics of time-series data, such as averages, maxima, minima, variability, and so forth, of data over specified time periods. As will be appreciated, in order to perform such computations, the data processing module 204 may require access to time-series data captured by various devices 202 over different time periods. Accordingly, in order to optimise access time for data that is repeatedly, commonly, or frequently required, the middleware server 102 includes a cache module 208.

When the data processing module 204 requires data from a particular time period, and some or all of the required data is not present in a cache maintained by the cache module 206, it may be necessary to retrieve additional data from the remote database server 118. Due to the cost of making such requests, in terms of CPU time and latency in receiving responses to database queries, it is desirable to avoid making requests that will not result in any additional data being returned. The middleware server thus further includes an indexing module 208 which is configured according to an embodiment of the invention to maintain one or more indices 210 of time-series data records held in a data store of the database server 118. In the embodiment disclosed herein, a separate index 210 is maintained for each source 202 of time-series data. Accordingly, when the processing module 204 requires time-series data corresponding with a particular data source 202 within a specified time period, and the required data is not present in the cache, the cache module 206 queries the indexing module 208, which searches the relevant index 210 to determine whether there is data stored by the database server 118 corresponding with the requirement of the processing module 204. Only if the index 219 indicates the existence of corresponding data in the remote data store is a query made to the database server 118 to retrieve the required time-series data.

The structure and operation of an index of time-series data records embodying the invention will now be described in detail with reference to FIGS. 3 to 7. In general terms, the index comprises a binary tree structure of nodes. A root node represents a maximal time period covered by the index. In one common approach, for example, time values may be represented as a number of milliseconds since 1 Jan. 1970. In such a representation, a signed 64-bit value may be used to store a maximal time period covering any range within the years 292,269,055 BCE to 292,278,994 CE. Of course, such a broad time-period has little practical application, and the root node may therefore be configured to represent any smaller maximal period, as required.

The binary tree structure also includes zero or more non-root nodes, in which each non-root node is a leaf node or an intermediate node (also commonly known as an 'internal' or 'inner' node, and herein shortened to 'inode' for brevity). As illustrated by the schematic diagram in FIG. 3, each leaf node and inode comprises a data structure 300 which includes an identifier or key field 302, and start-time 304 and end-time 306 fields defining a time range represented by the node. As a practical matter, so as to avoid possible overlap between time periods represented by different nodes, the end-time $t_{end}$ associated with a node should be less than the start-time $t_{start}$ of another node that represents a subsequent time range. For nodes representing immediately adjacent time ranges, in particular, the value of $t_{end}$ for the 'earlier' node will correspond with the time that is one minimum time unit (e.g. one millisecond, in the common scheme discussed above) prior to the value of $t_{start}$ for the 'later' node. The expression of this difference depends upon the representation of time, the time resolution, and the notational conventions employed in a particular embodiment. For the embodiments described herein, a convention is adopted whereby the time range represented by a node is inclusive of $t_{start}$ and exclusive of $t_{end}$, i.e. in formal notation the time range represented by the node structure 300 is $[t_{start}, t_{end})$. The key field 302 may be used, for example, to store a unique key corresponding with the associated time-series data, e.g. a unique identifier of the index 210 and/or data source 202.

In the case of an inode, further time fields 308, 310, 312, 314 may be provided to store child node start and end times, along with reference fields 316, 318, e.g. pointers, identifying one or both of a first child node representing a first time sub-range 308, 310 and a second child node representing a second time sub-range 312, 314. As will be appreciated, in some embodiments the sub-range fields 308, 310, 312, 314 may be omitted, since this information is duplicated in the start- and end-time fields 304, 306 of the child nodes. However, in maintaining the index is may be useful, e.g. more efficient in some operations, to be able to access this information without the need to dereference the pointers 316, 318 to the child nodes.

In a practical embodiment, the data structure 300 may be used to represent all nodes in the binary tree structure, even though all fields are not required by every node. For example, a leaf node can be represented by the structure 300 in which the sub-range fields 308, 310, 312, 314 and child reference fields 316, 318 are null. The root node may also include or consist of the same data structure 300, although the start-time 304 and end-time 306 fields may have a special interpretation, i.e. as defining the maximal time period covered by the index.

As will become apparent from the following discussion of exemplary operations on the binary tree structure embodying the invention, with reference to FIGS. 4A to 4F, in operation the existence of a leaf node in the binary tree structure is indicative of existence of at least one time-series data record in the data store corresponding with the time range represented by the leaf node. A simple depth-first search strategy can therefore be employed to rapidly determine whether a leaf node exists corresponding with a specified time period, and thus whether there is any corresponding time-series data held in the data store managed by the remote database server 118. It should be noted that while nodes in FIGS. 4A to 4F are labelled at 'root', 'inode', and 'leaf' nodes for ease of reference, in a practical implementation it is not necessary to maintain a specific record of each node type. The root node has a special status, having no parent node and being the initial node of the tree, and is therefore always identifiable. An inode is identifiable as a node having a parent node and at least one child node. A leaf node is identifiable as a node having a parent node and no child nodes.

Figure 4A:
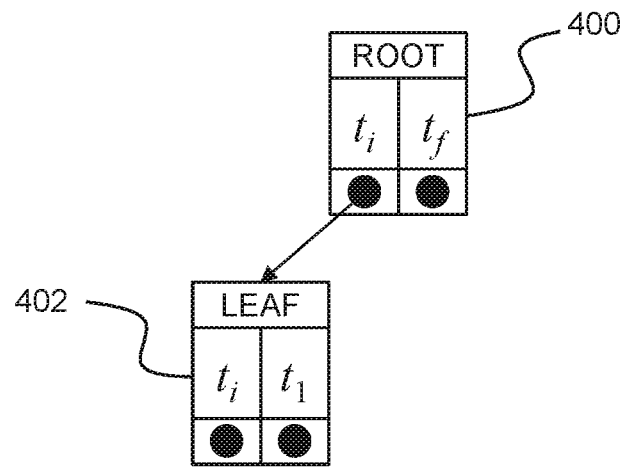
FIG. 4A to 4F show a series of schematic diagrams of binary tree structures illustrating exemplary operations on an index of time-series data embodying the invention.

FIG. 4A illustrates the addition of an initial leaf node to a binary tree structure embodying the invention. A root node 400 identifies a maximal time period bounded by times denoted $t_i$ (i.e. initial time) and $t_f$ (i.e. final time). Upon the addition of time-series data to the remote data store managed by database server 118, having an associated time lying between $t_i$ and a later time denoted a corresponding new leaf node 402 is created, and linked as a child node of the root node 400.

Figure 4B:
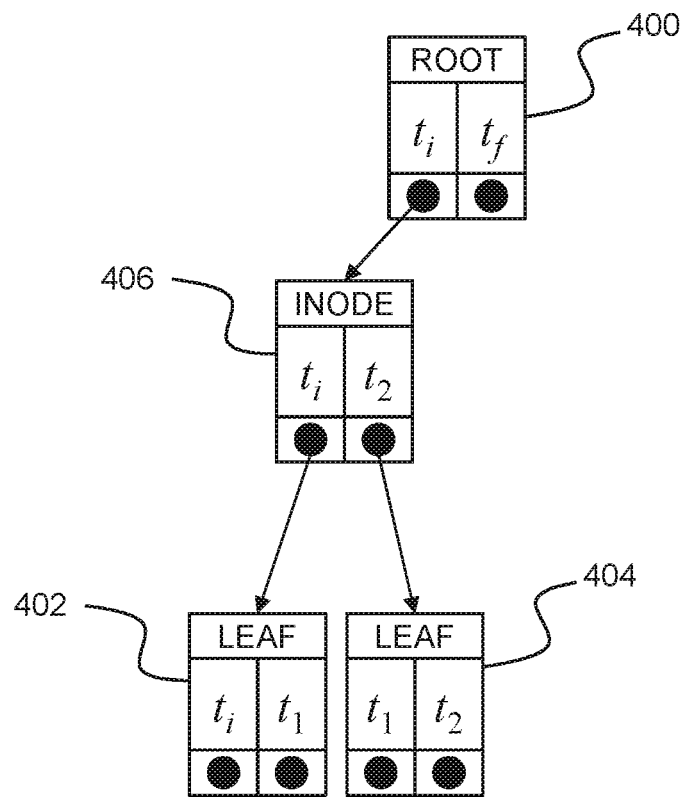
Figure 4C:
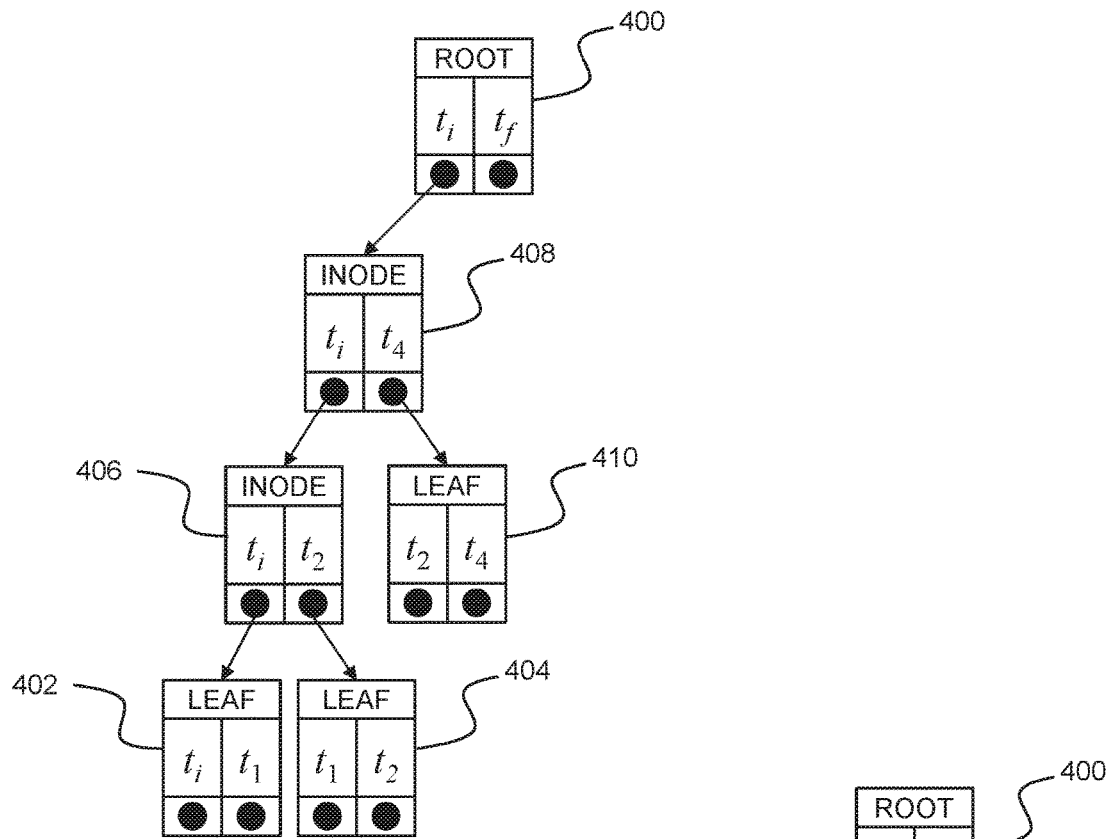

FIG. 4B illustrates an update to the tree structure to accommodate new time-series data added to the data store having an associated time later than $t_1$ and prior to some further subsequent time $t_2$. A new leaf node 404 is created, corresponding with the time sub-range between $t_1$ and $t_2$. In this example, $t_2$ is less than $t_f$, and thus the new leaf node cannot be added as a second child node of the root node 400. Accordingly, a new inode 406 is created, corresponding with the time range between $t_i$ and $t_2$. The new inode 406 is linked to the root node 400, and the leaf nodes 402, 404 linked as first and second child nodes of the inode 406.

FIG. 4O illustrates a further update to the tree structure to accommodate new time series data added to the data store having an associated time later than $t_1$ and prior to some further subsequent time $t_4$. Again, since $t_4$ is less than the final time $t_f$ a new leaf node cannot be added as a second child of the root node 400, and thus a new inode 408 is created, corresponding with the time range between $t_i$ and $t_4$, and linked in between the root node 400 and the existing inode 406. A new leaf node 410 is also created, corresponding with the time sub-range between $t_2$ and $t_4$, and added as a second child node of the new inode 408.

Figure 4D:
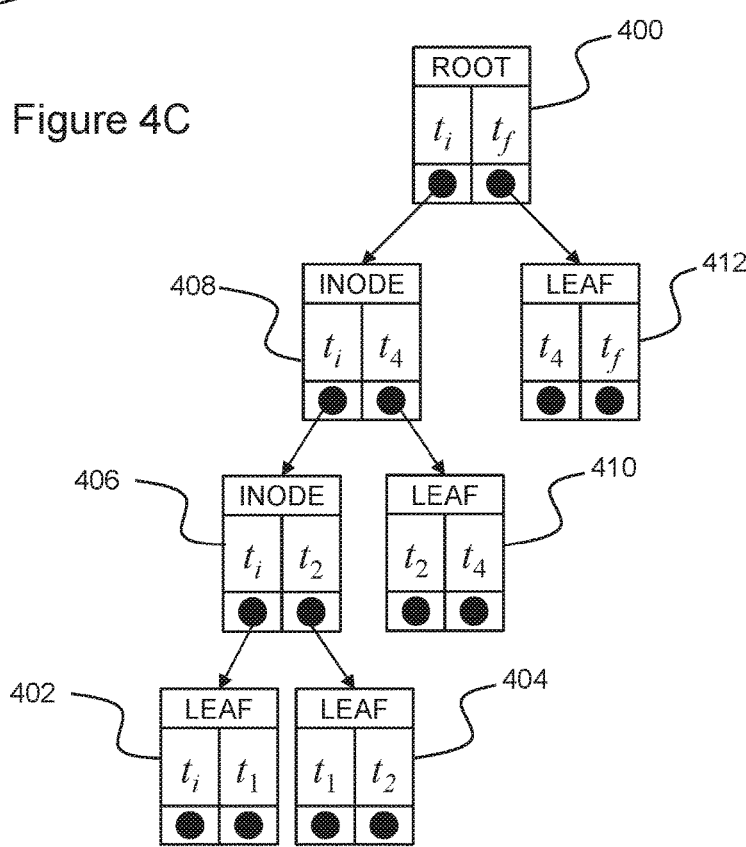

FIG. 4D illustrates an update to the tree structure in order to accommodate further time-series data having any associated time later than $t_4$. In this case, a new leaf node 412 is created, corresponding with the time sub-range between $t_1$ and $t_f$, and linked as a second child node of the root node 400.

Figure 4E:
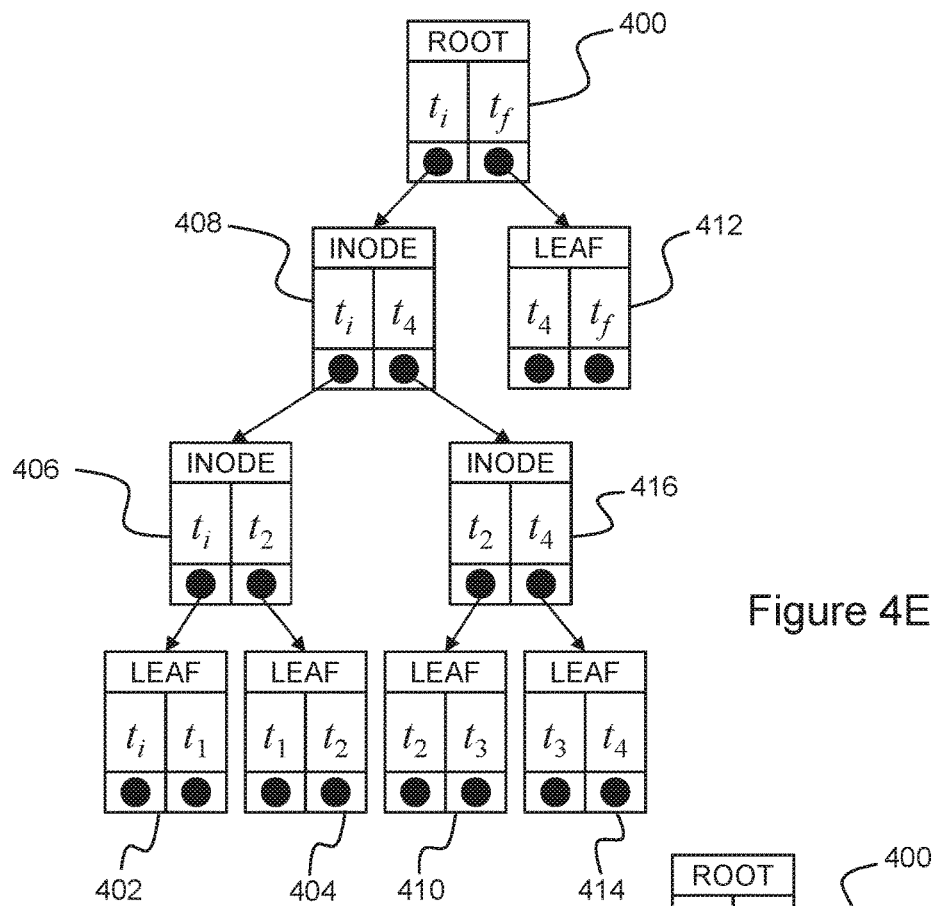

FIG. 4E illustrates an update to the tree structure that consists of a 'splitting' of the existing leaf node 410 to accommodate additional time-series data having an associated time falling within the existing range of $t_2$ to $t_4$. Such a split is required where, in a particular embodiment of the invention, each node of the binary tree structure is constrained to index up to a maximum number of time-series data records. Thus, if further time-series data records associated with a time sub-range of an existing leaf node are added to the data store—such that the number of time-series data records indexed by the existing leaf node would exceed the maximum number, once existing records are 'pooled' with the further time-series data to be added—a new leaf node must be created as shown in FIG. 4E. In this case, the existing leaf node 410 is split by selecting an intermediate time $t_3$ between $t_2$ and $t_4$, updating the end-time field of the leaf node 410 to $t_3$, and a new leaf node 414 is created with an associated time sub-range between $t_3$ and $t_4$. Additionally, a new inode 416 is created, corresponding with the time range between $t_2$ and $t_4$. The new inode 416 is linked to the existing inode 408, and the leaf nodes 410, 414 linked as first and second child nodes of the inode 416. It may be noted that, in an alternative implementation, the existing leaf node 410 may be converted to an inode by linking it to two newly-created leaf nodes, to produce the same final structure illustrated in FIG. 4E. The two implementations are wholly equivalent, and differ only in the specifics of how existing allocated node structures are updated, and new node structures allocated and populated.

Figure 4F:
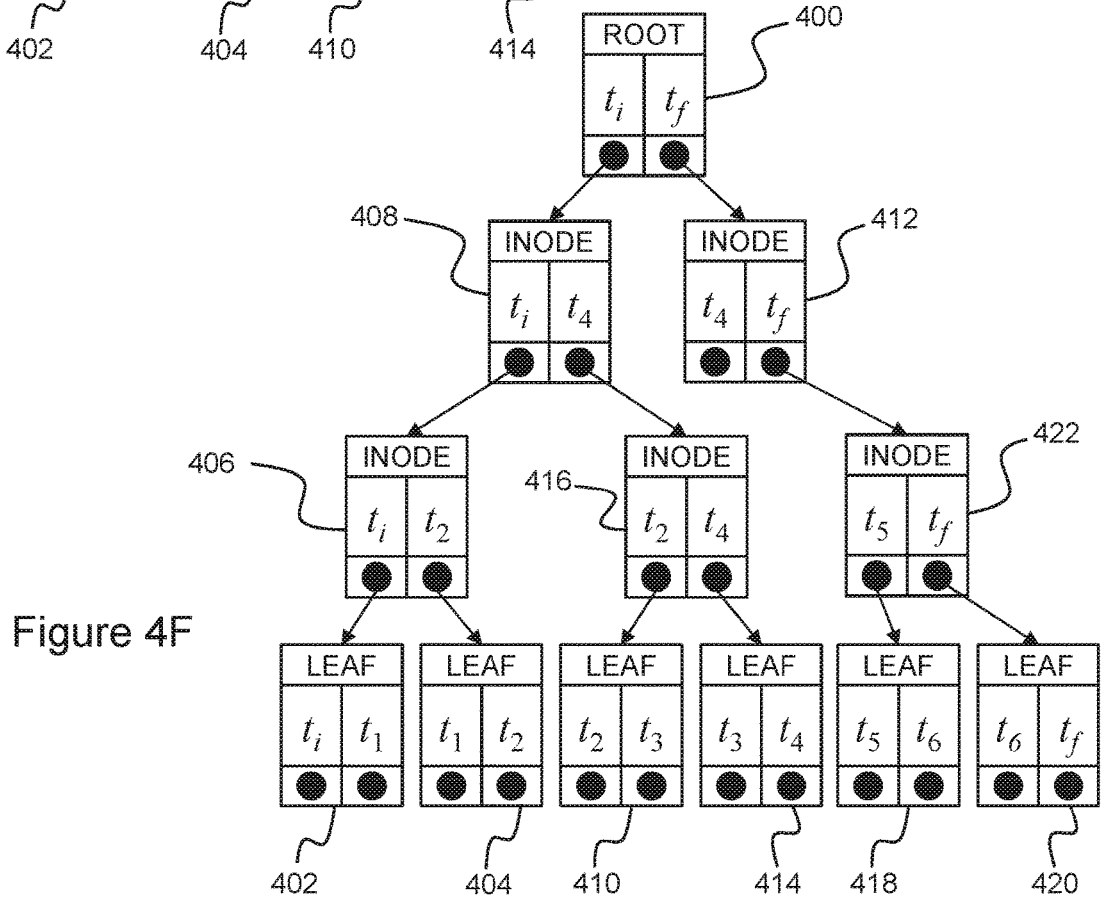

FIG. 4F illustrates yet another update to the tree structure, corresponding with the addition to the data store of a number of time-series data records having associated times later than a time $t_5$ which is, in turn, greater than $t_4$, and wherein the number of added records exceeds the maximum number of records permitted to be indexed by a single leaf node. In this case, it is assumed that there are no existing time-series data records in the data store associated with times falling in the range of $t_4$ to $t_5$. To accommodate this addition, two new leaf nodes 418, 420 are created with associated time sub-ranges between $t_5$ and $t_6$, and between $t_6$ and $t_f$ respectively, where $t_6$ is a time falling between $t_5$ and $t_f$. Additionally, a new inode 422 is created, corresponding with the time range between $t_5$ and $t_f$. The new inode 422 is linked to the existing node 412 (which is converted, as a result, to an inode having a single child link), and the leaf nodes 418, 420 linked as first and second child nodes of the inode 422. It will be noted that, at this point, there is a 'gap' in the index, i.e. there is no time-series data in the data store associated with any time between $t_4$ and $t_5$ and, accordingly, there are no leaf nodes in the tree structure corresponding with this time sub-range.

In the above discussion, it is implicitly assumed that some mechanism exists to determine the time intervals for node creation, and for defining a maximum number of records that may be indexed by a single node. In practice, these parameters of the indexing method may be closely related, and may depend upon the characteristics of the time-series data to be indexed, the design of the cache, and the desired resolution of the index. For example, consider an application in which a data source generates new time-series data records at a rate of approximately one record per hour, and where the cache is designed to retain local copies of the time-series data records in one-day blocks. In this scenario, a cache-miss will potentially result in data being requested from the remote data store in multiples of one day, and it may accordingly desirable for the index to have a resolution of one day or less. These considerations may suggest an initial design of the index in which the maximum number of records that may be indexed by a single node is approximately 24, and the default time boundaries used when assigning new start/end times to newly-created nodes are multiples of one day. Further adjustments to these parameters based on experience and/or actual performance of the index may be required. In any case, suitable selection of the parameters, in combination with additional heuristics that may be employed when extending (or, in some embodiments, pruning) the tree structure, should result in orderly and balanced growth of the tree, resulting in good performance of the index.

Figure 5:
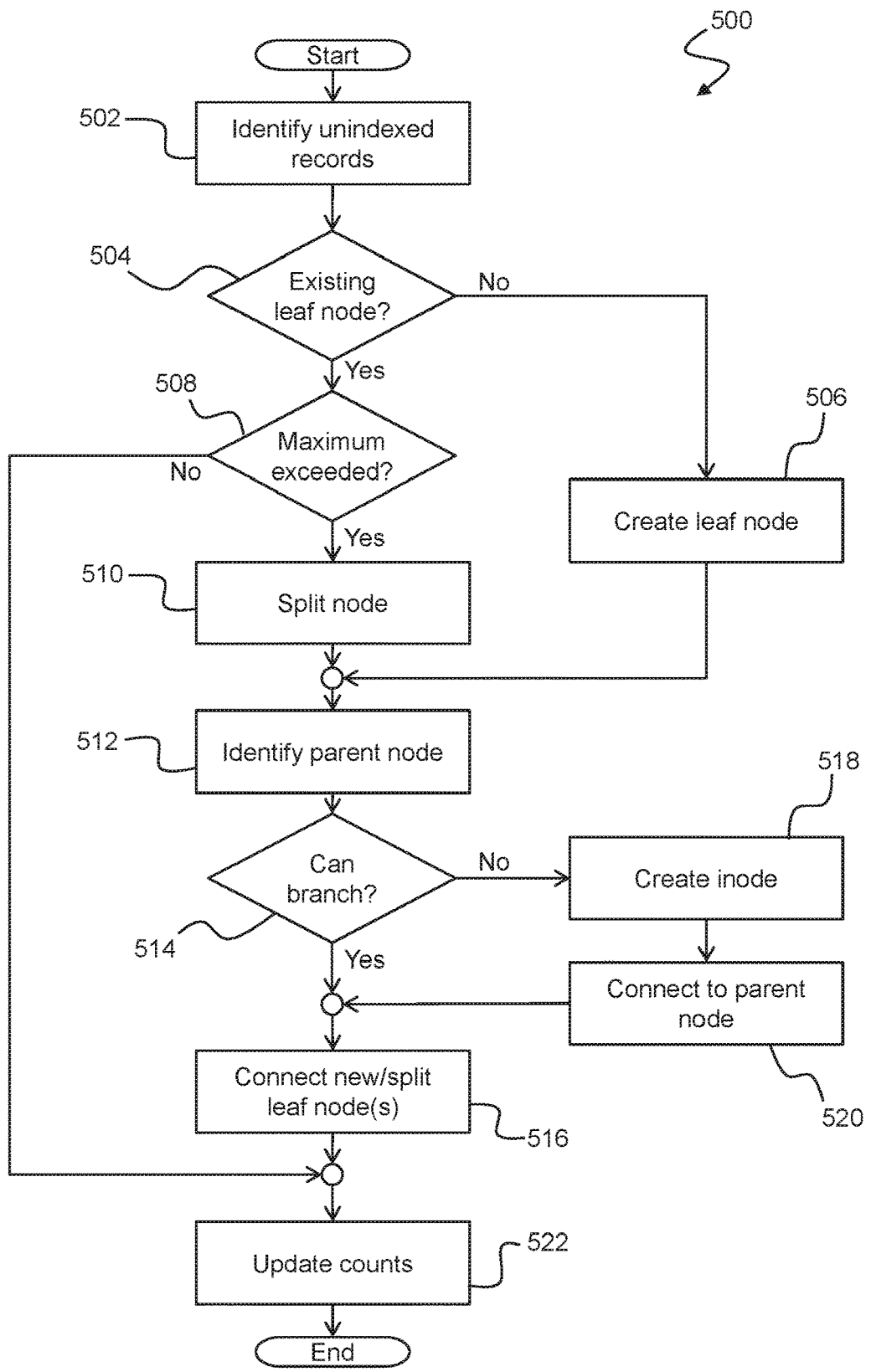
FIG. 5 shows a flowchart illustrating a general algorithm for updating the binary tree structure of an index embodying the invention, encompassing the various exemplary operations illustrated in FIGS. 4A to 4F.
Figure 6:
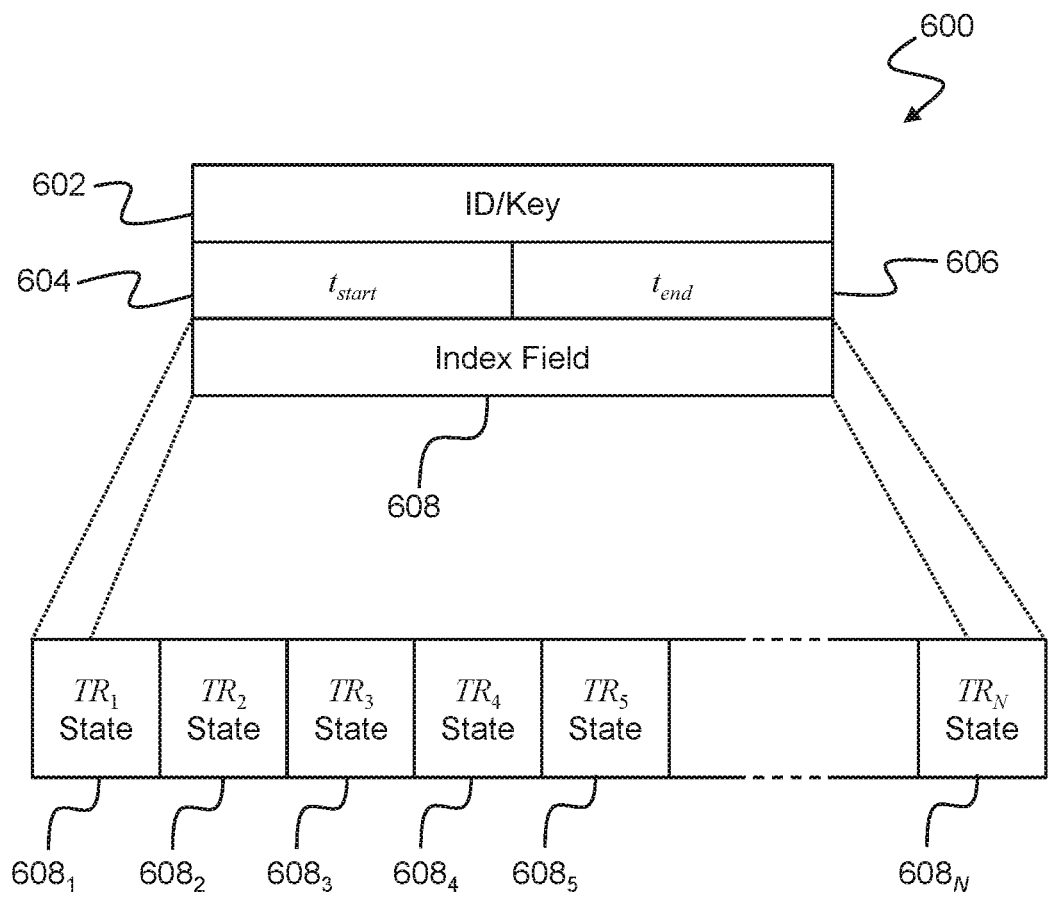
FIG. 6 is a schematic diagram of an alternative data structure representing a node in an index of time-series data embodying the invention.

FIG. 5 shows a flowchart 500 illustrating a general algorithm for updating the binary tree structure of an index embodying the invention, which encompasses the various exemplary operations described above with reference to FIGS. 4A to 4F. In an initial step 502, currently-unindexed records are identified, along with an associated time range. At step 504 the tree is searched to determine whether one or more existing leaf nodes encompass the time range associated with the newly-identified records. If not, then at step 506 a new leaf node is created encompassing the additional time range. Alternatively, if one or more corresponding leaf nodes are already present, a check is made at step 508 to determine whether the additional time-series data records will result in the maximum number of records for the existing leaf node(s) being exceeded. It should be noted that this check may be made by the indexing module 208, or may be based upon a signal received from the cache module 206, i.e. keeping track of the number of records associated with a given time interval may, in different implementations, be the responsibility of either the indexing module 208 or the cache module 206. If the currently-unindexed records identified at step 502 are merely cumulative to existing records within the same time range, and do not exceed the maximum that can be indexed by the existing leaf node(s), then no update to the tree structure is required.

Alternatively, in the event that the additional time-series data records will result in the maximum number of records being exceeded for an existing leaf node, then at step 510 the leaf node is split, e.g. as illustrated by the creating of the new leaf node 414 as described above with reference to FIG. 4E. As will be appreciated, either the creation of a new leaf node at step 506, or the splitting of a leaf node at step 510, result in a requirement to link new and/or existing leaf nodes to an appropriate parent inode. Accordingly, at step 512 the best existing candidate parent node is identified, being an existing leaf node or inode that encompasses the time sub-range of the leaf node(s) to be linked.

At step 514 a check is made to determine whether the identified parent node can be simply branched to add the new leaf node(s). Branching is possible where the identified node has an unused (i.e. null) reference field corresponding with one of its two possible child nodes that is aligned with the start- or end-time (as appropriate) of the leaf node to be linked. An example of such branching is the connection of new leaf node 412 to the root node 400 described above with reference to FIG. 4D. If simple branching is possible, then the new leaf node(s) are connected to the identified parent inode at step 516.

If simple branching is not possible, then at step 518 a new inode is created to act as a common 'base' node for the leaf nodes to be connected. At step 526, the new inode is connected to the appropriate corresponding parent node. An example of this process has been described above with reference to FIG. 4F, where a new inode 422 was created, and connected to existing node 412 as the corresponding parent node. The new inode is then treated as the parent node for the new or split leaf node(s), and connected at step 516.

Finally, at step 522, counts of the number of records by each leaf node may be updated. As has been noted above, this update may be either implicit or explicit, and may be implemented either within the indexing module 208 or the cache module 206. Thus, maintaining explicit counters within the index is not a necessary or essential feature of the indexing module 208.

While the above-described embodiment of the invention provides a reasonable ratio of index data to number of time-series data records, for applications involving large amounts of data, the binary tree structure of the index may nonetheless become undesirably large. For instance, an index covering a maximal time period of five years, for data records captured around once every five minutes, may be required to index up to 525,600 time-series data records. If the maximum number of records per leaf node is set to 300, the binary tree structure for the index may require approximately 4000 nodes. Accordingly, embodiments of the invention may provide a mechanism to reduce the number of index nodes for large data sets.

Such embodiments may take advantage of the fact that, when storing large amounts of time-series data, a common solution employed in many databases is to partition the data. For instance, a set of time-series data records having a five-minute capture period may be partitioned into daily partitions each containing 288 records. If a query to the database is restricted to a single day, only a single partition will be queried. It is therefore useful to align the cache implementation to the data store partition interval, e.g. such that the cache is designed to retain local copies of the time-series data records in one-day blocks. This has the advantage that when queries are made to the data store they are aligned and optimized.

In such an implementation, it may be sufficient to track whether or not there is any time-series data present in the data store on a per-partition (or other convenient interval) basis. An alternative leaf node data structure 600 embodying the invention, and which efficiently provides such a per-partition indication of the existence of data within the data store, is illustrated schematically in FIG. 6. As for the data structure 300 illustrated in FIG. 3, the alternative structure 600 includes an identifier or key field 602, and start-time 604 and end-time 606 fields defining a time range represented by the node. However, in place of (or, optionally, in addition to) the further time fields 308, 310, 312, 314, and reference fields 316, 318, the structure 600 includes an index field 608.

In particular, the index field 608 includes a plurality of time-series data existence indicator elements $608_1$, $608_2$, ... $608_N$. Each of these time-series data existence indicator elements represents a corresponding fixed time range $TR_1$, $TR_2$, ... $TR_N$ within the time range represented by the node. Each indicator element is indicative of the existence in the data store of time-series data within the fixed time range. Each fixed time range may correspond with a partition of time-series data within the data store.

Each time-series data existence indicator element $608_1$, $608_2$, ... $608_N$ may comprise at least a positive state, indicative of existence in the data store of time-series data within the corresponding fixed time range, and a negative state, indicative of non-existence in the data store of time-series data within the corresponding fixed time range. For example, a single bit may be used for this purpose, with one binary value (e.g. a '1' state) indicating the presence of time-series data, and the inverse value (e.g. a '0' state) indicating the absence of time-series data. In some embodiments, additional state information may be represented by the time-series data existence indicator elements $608_1$, $608_2$, ... $608_N$. For example, if two bits are assigned to each indicator element, an additional two states may be represented, e.g. an 'unknown' state, indicating that it is not known whether time-series data exists in the data store within the corresponding fixed time range (pending a request to the database server 118), and an 'additional index' state, indicating that one or more additional nodes exist for indexing time-series data records within the corresponding fixed time range.

As an example, in an embodiment in which the index field 608 comprises 256 bits, it is possible to index data in 256 partitions for data existence only (i.e. 'positive' and 'negative' indications), or 128 partitions with four options (e.g. 'positive', 'negative', 'unknown' and 'additional index' indications). According to this embodiment, five years of data may be indexed by approximately 35 index nodes.

It should be appreciated that while particular embodiments and variations of the invention have been described herein, further modifications and alternatives will be apparent to persons skilled in the relevant arts. In particular, the examples are offered by way of illustrating the principles of the invention, and to provide a number of specific methods and arrangements for putting those principles into effect. In general, embodiments of the invention rely upon providing technical arrangements whereby an index comprising a binary tree structure of nodes is maintained so as to provide an indication of existence of one or more identified time-series data records corresponding with a specified time range within a data store. In various embodiments, the index records can be stored in the same database 118 as the time series data or in another store (local or remote). Only a portion of the index actually in-use at any time needs to be in memory 114. In particular, records not accessed need not be in memory. An index corresponding with a source 202 of time-series data may thus be loaded only when a request for data from the source's time series is being accessed. The index may be associated with a cache, and employed to enable the cache to determine whether or not data for a given time interval is present in the data store, so as to avoid making requests that will not result in any additional data being returned. This may result in significant performance enhancements, due to the cost in CPU time and data latency when unnecessary queries are executed.

The described embodiments should be understood as being provided by way of example, for the purpose of teaching the general features and principles of the invention, but should not be understood as limiting the scope of the invention, which is as defined in the appended claims.

The invention claimed is:

1. A method of maintaining an index of time-series data records held in a data store, the time-series data records each comprising a time element, the index having a binary tree structure of nodes including a root node representing a maximal time period and zero or more non-root nodes, wherein each non-root node is a leaf node or an inode which comprises a data structure including a start-time field and an end-time field defining a time range represented by the non-root node and, in the case of an inode, reference fields identifying one or both of a first child node representing a first time sub-range and a second child node representing a second time sub-range, and wherein existence of a leaf node in the binary tree structure is indicative of existence of at least one time-series data record in the data store, the time element of which has an associated time corresponding with the time range represented by the leaf node, the method comprising:
   identifying one or more time-series data records in the data store not currently indexed in the binary tree structure and comprising time elements having associated times corresponding with a time range;
   creating a new leaf node;
   populating the start-time and end-time fields of the new leaf node with values encompassing the time range corresponding with the times associated with the time elements of the identified time-series data records; and updating the binary tree structure such that the new leaf node is added as a first or second child node of a parent node representing a time range encompassing the values of the start-time and end-time fields of the new leaf node, whereby existence of the new leaf node in the binary tree structure is indicative of existence of the one or more identified time-series data records in the data store.

2. The method of claim 1 wherein updating the binary tree structure comprises adding the new leaf node as a first or second child node of an existing node of the binary tree structure.

3. The method of claim 1 wherein updating the binary tree structure comprises:

creating at least one new inode;

populating the start-time and end-time fields of the new inode with values encompassing the time range corresponding with the times associated with the time elements of the identified time-series data records and a time range corresponding with an existing leaf node, wherein the existing leaf node has an existing parent node representing a broader encompassing time range;

populating the reference fields of the new inode with references identifying each one of the existing leaf node and the new leaf node as one of the first and second child nodes of the new inode; and updating the binary tree structure such that a reference to the new inode replaces a reference to the existing leaf node in the existing parent node.

4. The method of claim 1 wherein each node of the binary tree structure is constrained to index up to a maximum number of time-series data records, wherein indexing the one or more identified time-series data records by an existing leaf node would exceed the maximum number, and wherein updating the binary tree structure comprises:

pooling the identified time-series data records with time series data records indexed by the existing leaf node;

creating at least two new nodes, such that the existing leaf node and the new nodes comprise at least a base inode and first and second leaf nodes;

populating the start-time and end-time fields of the first leaf node with values encompassing a first time sub-range corresponding with up to the maximum number of time-series data records from the pooled time-series data records, and the start-time and end-time fields of the second leaf node with values encompassing a second time sub-range corresponding with up to the maximum number of time-series data records from the pooled time-series data records, wherein the first time sub-range is distinct from the second time sub-range; and updating the binary tree structure such that the first and second leaf nodes are added as first and second child nodes of the base inode, which is linked to a parent node representing a time range encompassing the values of the start-time and end-time fields of the first and second leaf nodes.

5. The method of claim 1 wherein at least one node of the binary tree structure comprises an index field including a plurality of time-series data existence indicator elements, wherein each time-series data existence indicator element represents a corresponding fixed time range encompassed by the time range represented by the node and is indicative of the existence in the data store of time-series data comprising time elements having associated times within the fixed time range.

6. The method of claim 5 wherein each time-series data existence indicator element comprises at least:

a positive state, indicative of existence in the data store of time-series data within the corresponding fixed time range; and a negative state, indicative of non-existence in the data store of time-series data within the corresponding fixed time range.

7. The method of claim 6 wherein each time-series data existence indicator further comprises one or more of:

an 'unknown' state, indicative that it is not known whether time-series data exists in the data store within the corresponding fixed time range; and an 'additional index' state, indicative that one or more additional nodes exist for indexing time-series data records within the corresponding fixed time range.

8. The method of claim 7 wherein each fixed time range corresponds with a partition of time-series data records held in the data store.

9. A computer program product comprising a non-transitory computer-readable medium having instructions stored thereon which, when executed by a processor implement a method of maintaining an index of time-series data records held in a data store according to claim 1.

10. A method of managing a cache of time-series data records held in a data store, the time-series data records each comprising a time element, the method comprising:

providing a time-series data index having a binary tree structure of nodes including a root node representing a maximal time period and zero or more non-root nodes, wherein each non-root node is a leaf node or an inode which comprises a data structure including a start-time field and an end-time field defining a time range represented by the non-root node and, in the case of an inode, reference fields identifying one or both of a first child node representing a first time sub-range and a second child node representing a second time sub-range, and wherein existence of a leaf node in the binary tree structure is indicative of existence of at least one time-series data record in the data store comprising time elements having associated times corresponding with the time range represented by the leaf node;

receiving a request for one or more time-series data records not contained in the cache, and corresponding with a requested time interval;

searching the time-series data index for a leaf node representing a time range corresponding with the requested time interval; and returning an indication of the existence of data records comprising time elements having associated times corresponding with the requested time interval in the data store, based upon the result of searching the time-series data index.

11. The method of claim 10 which, in the event that data records comprising time elements having associated times corresponding with the requested time interval exist in the data store, further comprises:

retrieving the data records comprising time elements having associated times corresponding with the requested time interval from the data store; and storing the retrieved data records in the cache.

12. The method of claim 10 wherein, in the event that no leaf node is identified that represents the time range corresponding with the requested time interval, a negative indication of the existence of data records comprising time elements having associated times corresponding with the requested time interval in the data store is returned.

13. A computer program product comprising a non-transitory computer-readable medium having instructions stored thereon which, when executed by a processor implement a method of managing a cache of time-series data records held in a data store according to claim 10.

14. A system for maintaining an index of time-series data records held in a data store, the time-series data records each comprising a time element, the system comprising:
   a processor; and
   at least one memory device accessible via the processor, which contains a binary tree structure of nodes including a root node representing a maximal time period and zero or more non-root nodes, wherein each non-root node is a leaf node or an inode which comprises a data structure including a start-time field and an end-time field defining a time range represented by the non-root node and, in the case of an inode, reference fields identifying one or both of a first child node representing a first time sub-range and a second child node representing a second time sub-range, and wherein existence of a leaf node in the binary tree structure is indicative of existence of at least one time-series data record in the data store, the time element of which has an associated time corresponding with the time range represented by the leaf node,
   the memory device further containing a body of program instructions which, when executed by the processor, cause the computing system to implement a method comprising steps of:
      identifying one or more time-series data records in the data store not currently indexed in the binary tree structure and comprising time elements having associated times corresponding with a time range;
      creating a new leaf node;
      populating the start-time and end-time fields of the new leaf node with values encompassing the time range corresponding with the times associated with the time elements of the identified time-series data records; and
      updating the binary tree structure such that the new leaf node is added as a first or second child node of a parent node representing a time range encompassing the values of the start-time and end-time fields of the new leaf node,
      whereby existence of the new leaf node in the binary tree structure is indicative of existence of the one or more identified time-series data records in the data store.

15. A system for managing a cache of time-series data records held in a data store, the time-series data records each comprising a time element, the system comprising:
   a processor; and
   at least one memory device accessible via the processor, which contains a time-series data index having a binary tree structure of nodes including a root node representing a maximal time period and zero or more non-root nodes, wherein each non-root node is a leaf node or an inode which comprises a data structure including a start-time field and an end-time field defining a time range represented by the non-root node and, in the case of an inode, reference fields identifying one or both of a first child node representing a first time sub-range and a second child node representing a second time sub-range, and wherein existence of a leaf node in the binary tree structure is indicative of existence of at least one time-series data record in the data store comprising time elements having associated times corresponding with the time range represented by the leaf node, the memory device further containing a body of program instructions which, when executed by the processor, cause the system to implement a method comprising steps of:
      receiving a request for one or more time-series data records not contained in the cache, and corresponding with a requested time interval;
      searching the time-series data index for a leaf node representing a time range corresponding with the requested time interval; and
      returning an indication of the existence of data records comprising time elements having associated times corresponding with the requested time interval in the data store, based upon the result of searching the time-series data index.

* * * * *